Patented Aug. 18, 1936

2,051,096

UNITED STATES PATENT OFFICE 2,051,096

MANUFACTURE OF CARBOXYLIC ACID CHLORIDES

Joseph R. Mares, St. Louis, Mo., assignor to Monsanto Chemical Company, St. Louis, Mo., a corporation of Delaware No Drawing. Application November 29, 1933, Serial No. 700,363

7 Claims. (Cl. 260—123)

This invention relates to the manufacture of carboxylic acid chlorides. Briefly stated, the invention involves the interaction of an anhydride of a carboxylic acid and a hydrocarbon having at least two chlorine atoms joined to a carbon atom such as chloroform, carbon tetra chloride, trichlorethane, hexachlorethane, unsymmetrical ethylene dichloride and the like.

The lower halogenated aliphatic hydrocarbons are generally considered to be inert chemical substances. Thus, for example, carbon tetra chloride, ethylene dichloride, ethylene tetra chloride, tetrachlorethane and the like are commonly employed as solvents, cleaning agents, etc., because of their solvent action as well as their stability.

I have now found that these substances react with anhydrides of carboxylic acids to form acid chlorides. The reaction in the case of phthalic anhydride and carbon tetra chloride may be represented as follows:

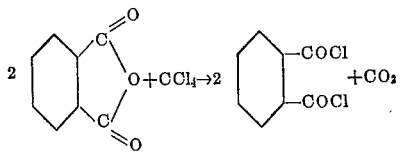

Inasmuch as some phosgene is formed it is possible that the reaction proceeds in two steps, the first of which results in the formation of phthalyl chloride and carbonyl chloride, after which the carbonyl chloride combines with additional phthalic anhydride to form phthalyl chloride and carbon dioxide.

I have also found that the reaction may be accelerated by the addition of a large variety of substances which appear to function as catalysts. Thus, one may employ finely divided zinc, aluminum, iron, anhydrous zinc chloride, aluminum chloride, ferric chloride or other salts of metals the aqueous solution of which gives an acidic reaction to litmus paper.

The following examples will serve to illustrate embodiments of my invention.

*Example I.*—Carbon tetra chloride is permitted to drop on the surface of molten phthalic anhydride containing approximately 2% by weight of anhydrous zinc chloride while maintaining a temperature of approximately 250°–280° C. The apparatus is preferably equipped with a reflux condenser whereby one may gauge of the completeness of the reaction. After it is evident from the reflux condenser that carbon tetra chloride is no longer consumed, the reaction mixture is permitted to cool whereupon the solid phthalic anhydride may be separated from the phthalyl chloride by decantation or by draining. The catalyst may be removed from the product conveniently by distillation.

*Example II.*—Molten phthalic anhydride maintained at 220°–270° C. and containing 1% by weight of a mixture of equal parts of aluminum chloride and zinc chloride is caused to react with carbon tetra chloride which is supplied to the mixture in vapor form near the base of the reaction mixture. The gases which are evolved are passed through a condenser whereby the unreacted carbon tetra chloride is recovered and the carbon dioxide and phosgene separated thereby After the reaction has subsided, as evidenced by the fact that little or no uncondensable gas is evolved, the mixture is permitted to cool and the product is recovered as in the preceding example.

*Example III.*—A substantially equal molar vapor mixture of phthalic anhydride and carbon tetra chloride is conducted at approximately 300° C. over pumice stone which is impregnated with zinc chloride and aluminum sulphate. The vapors are condensed and the product is recovered by decantation or draining. If desired, the residual phthalic anhydride may be washed with cold, dry benzol to free it from occluded phthalyl chloride.

*Example IV.*—Substitute benzoic anhydride for the phthalic anhydride in Example II. It is convenient to condense the volatilized benzoyl chloride and subsequently separate any carbon tetra chloride therefrom by distillation. The carbon tetra chloride is then returned for reuse.

*Example V.*—Two mols of acetic anhydride and slightly more than one mol of carbon tetra chloride are heated in an autoclave to the reaction temperature. Acetyl chloride is formed. The reaction temperature is lowered substantially by the addition of 1% by weight of anhydrous zinc chloride.

*Example VI.*—Two molar proportions of phthalic anhydride and one molar proportion of hexachlorethane is heated in an autoclave at 250° C. One thus obtains phthalyl chloride, carbon dioxide, phosgene and small amounts of chlor substituted acetyl compounds. The same reaction may be effected by adding hexachlorethane to molten phthalic anhydride at atmospheric pressure as in Example I.

*Example VII.*—Substitute chloroform for carbon tetra chloride in Example I and proceed as described therein; phthalyl chloride is formed.

Other acid anhydrides may be treated in an analogous manner, as, for example, the anhydride of chlor benzoic acid, monochlor phthalic anhydride, tetra chlor phthalic anhydride, succinic anhydride, et al.

It is to be understood that the conditions of pressure and temperature may be varied and that in general the more catalyst employed the lower the reaction temperature. Although various embodiments of the invention are set forth it is to be understood that the invention is susceptible to other variations and modifications without departing from its scope as defined in the appended claims.

What I claim is:

1. A method of producing an acid chloride of a carboxylic acid which comprises heating to reaction temperature a mixture consisting of the corresponding acid anhydride and an alkyl hydrocarbon having a polychlor substituted carbon atom.

2. A method of producing an acid chloride of an armotic carboxylic acid which comprises heating to reaction temperature a mixture consisting of the corresponding acid anhydride and an alkyl hydrocarbon having a polychlor substituted carbon atom.

3. A method of producing phthalyl chloride which comprises heating to reaction temperature a mixture consisting of phthalic anhydride and an alkyl hydrocarbon having a polychlor substituted carbon atom.

4. The method of forming phthalyl chloride that comprises heating to reaction temperature phthalic anhydride with carbon tetra chloride.

5. The method of claim 2 in which the reaction is effected in the presence of an anhydrous inorganic acid-reacting polyvalent metal salt.

6. A method of producing an acid chloride of a carboxylic acid which comprises heating to reaction temperature a mixture consisting of the corresponding acid anhydride and an alkyl chloride containing at least three chlorine atoms attached to a single carbon atom.

7. The method of claim 6 in which the anhydride is that of a dicarboxylic acid.

JOSEPH R. MARES.